United States Patent
Bhatkar et al.

(10) Patent No.: US 10,341,373 B2
(45) Date of Patent: Jul. 2, 2019

(54) AUTOMATICALLY DETECTING INSIDER THREATS USING USER COLLABORATION PATTERNS

(71) Applicant: SYMANTEC CORPORATION, Mountain View, CA (US)

(72) Inventors: Sandeep Bhatkar, Sunnyvale, CA (US); Saurabh Shintre, Sunnyvale, CA (US); Ashwin Kayyoor, Sunnyvale, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 163 days.

(21) Appl. No.: 15/629,421

(22) Filed: Jun. 21, 2017

(65) Prior Publication Data
US 2018/0375883 A1 Dec. 27, 2018

(51) Int. Cl.
*H04L 29/06* (2006.01)

(52) U.S. Cl.
CPC ...... *H04L 63/1425* (2013.01); *H04L 63/1441* (2013.01)

(58) Field of Classification Search
CPC .................................................. H04L 63/1245
USPC ........................................................ 726/23
See application file for complete search history.

(56) References Cited

U.S. PATENT DOCUMENTS

| 2014/0165195 | A1  | 6/2014  | Brdiczka et al. |
| 2015/0074806 | A1* | 3/2015  | Roundy ................. G06F 21/55 726/23 |
| 2017/0063909 | A1  | 3/2017  | Muddu et al. |
| 2018/0337935 | A1* | 11/2018 | Marwah ............. H04L 63/1425 |

OTHER PUBLICATIONS

U.S. Appl. No. 15/199,336, filed Jun. 30, 2016. titled "Systems and Methods for Protecting Computing Resources", 56 pages.
Eberle, William et al., "Insider Threat Detection Using Graph-Based Approaches", 2009, http://citeseerx.ist.psu.edu/viewdoc/download?doi=10.1.1.720.639&rep=rep1&type=pdf, 5 pages.

(Continued)

*Primary Examiner* — Longbit Chai
(74) *Attorney, Agent, or Firm* — Maschoff Brennan (57) ABSTRACT

Automatically detecting insider threats using user collaboration patterns. In one embodiment, a method may include identifying collaborative access of one or more network resources in a network between a target user using a target network device and other users using other network devices in the network during multiple prior time periods and during a current time period, generating prior collaboration graphs for the prior time periods, generating an average collaboration graph by combining the prior collaboration graphs, generating a current collaboration graph for the current time period, generating an anomaly score by comparing the current collaboration graph to the average collaboration graph, determining that the collaborative access of the one or more network resources during the current time period is anomalous by determining that the anomaly score exceeds a threshold, and, in response to the anomaly score exceeding the threshold, performing a security action on the target network device.

16 Claims, 4 Drawing Sheets

(56) References Cited

OTHER PUBLICATIONS

Akoglu, Leman et al., "Graph based Anamoly Detection and Description: A Survey", Apr. 18, 2014, http://www3.cs.stonybrook.edu/~leman/pubs/14-dami-graphanomalysurvey.pdf, 68 pages.

Collins, Michael, "A Protocol Graph Based Anomaly Detection System", School of Electrical and Computer Engineering, Carnegie Mellon University, Apr. 28, 2008, https://www.cs.unc.edu/~reiter/theses/collins.pdf, 154 pages.

Eberle, William et al., "Insider Threat Detection Using Graph-Based Approach", Oct. 16, 2014, http://www.eecs.wsu.edu/~holder/pubs/EberleCAEWIT10.pdf, 10 pages.

Noble, Caleb C. et al., "Graph Based Anomaly Detection", presented at SIGKDD'03, Aug. 2003 Washington D.C. http://ailab.wsu.edu/subdue/papers/NobleKDD03.pdf, 7 pages.

Parveen, Pallabi et al., "Insider Threat Detection using Steam Mining and Graph Mining", Department of Computer Science, The University of Texas at Dallas, Aug. 24, 2003, https://www.utdallas.edu/~kxh060100/parveen-passat11. pdf, 9 pages.

Neil, Joshua. "Scan statistics for the online detection of locally anomalous subgraphs." (2011). http://digitalrepository.unm.edu/math_etds/60 accessed Jun. 20, 2016.

International Search Report & Written Opinion for PCT Application No. PCT/US2018/33502, dated Jul. 30, 2018, 14 pages.

\* cited by examiner

AUTOMATICALLY DETECTING INSIDER THREATS USING USER COLLABORATION PATTERNS

BACKGROUND

Many modern organizations have a security operations center (SOC) to deal with security issues on an organizational and technical level. An SOC may be a centralized unit where security applications and/or network administrators supervise, among other things, the organization's network and network devices to monitor for, investigate, and defend from potential security threats. For example, the SOC may be tasked with monitoring network devices using security applications that alert SOC network administrators each time that a network device is suspected of having been compromised from a security standpoint. For example, a network device may be compromised due to a user within the organization's network, such as an employee, a contractor, or a business associate, having gone rogue. Such a user is commonly referred to as an "insider" and this situation is commonly referred to as an "insider threat."

An insider threat can leave an organization's network particularly vulnerable because the user may have extensive access to the network. This extensive access may enable the user to pose a greater threat to the organization's network that a typical "outsider" without such access. The threats posed by insider threat may include fraud, the theft of confidential or commercially valuable information, the theft of intellectual property, or the sabotage of computer systems. However, since the user involved in an insider threat has been given extensive access to the organization's network, it can be difficult for SOC network administrators of the organization to manually detect a potential insider threat in time to defend the organization's network, which leaves the network and associated network devices vulnerable.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for automatically detecting insider threats using user collaboration patterns may be performed, at least in part, by a computing device including at least one processor. The method may include identifying collaborative access of one or more network resources in a network between a target user using a target network device and other users using other network devices in the network during multiple prior time periods and during a current time period. The method may also include generating prior collaboration graphs for the prior time periods with nodes representing the target user and the other users and edges representing collaborative access of the one or more network resources during the prior time periods between the target user and the other users. The method may further include generating an average collaboration graph by combining the prior collaboration graphs. The method may also include generating a current collaboration graph for the current time period with nodes representing the target user and the other users and edges representing collaborative access of the one or more network resources during the current time period between the target user and the other users. The method may further include generating an anomaly score by comparing the current collaboration graph to the average collaboration graph. The method may also include determining that the collaborative access of the one or more network resources during the current time period is anomalous by determining that the anomaly score exceeds a threshold. The method may further include, in response to the anomaly score exceeding the threshold, performing a security action on the target network device.

In some embodiments, the one or more network resources may include one or more of an electronic file, online documentation, a network device, and a database. In some embodiments, the generating of the average collaboration graph may include generating a k-step neighborhood network of the prior collaboration graphs. In some embodiments, the generating of the anomaly score may include determining a distance between the current collaboration graph and the average collaboration graph. In some embodiments, the determining that the anomaly score exceeds the threshold may include determining that the current collaboration graph is larger or smaller in size than the average collaboration graph. In some embodiments, the determining that the anomaly score exceeds the threshold may include determining that the current collaboration graph has a different composition than the average collaboration graph.

Also, in some embodiments, the performing of the security action on the target network device may include one or more of blocking the target network device from having access to a website, at least partially blocking the target network device from having access to the network, at least partially blocking the target network device from sending data over the network, and preventing the target network device from accessing email.

Further, in some embodiments, one or more non-transitory computer-readable media may include one or more computer-readable instructions that, when executed by one or more processors, cause the one or more processors to perform a method for automatically detecting insider threats using user collaboration patterns.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Some embodiments in this disclosure relate to automatically detecting insider threats using user collaboration patterns.

Network administrators tasked with monitoring for, investigating, and defending against potential insider threats to a network of an organization, such as security operations center (SOC) network administrators, may be unable to manually detect insider threats in time to defend the organization's network. For example, the organization may have tens of thousands of users with extensive "insider" access to tens of thousands of network devices connected to its network. The sheer number of users with insider access to the network, and the sheer volume of collaboration on the network by those users during any given time period, may make it difficult for the SOC network administrators to manually determine whether any particular user's behavior is anomalous (suspicious) during any particular time period. This may result in actual insider threats, and corresponding compromised network devices, remaining unaddressed, which leaves the network vulnerable.

The embodiments disclosed herein may provide various benefits. In particular, the embodiments disclosed herein may, for example, enable automatically detecting insider threats using user collaboration patterns.

In some embodiments, automatically detecting insider threats using user collaboration patterns may include generating collaboration graphs for a target user that each represents the collaborative access of one or more network resources in a network between a target user using a target network device and other users using other network devices. For example, by generating collaboration graphs for a target user during successive time periods, then generating an average collaboration graph based on the successive collaboration graphs, and finally generating a collaboration graph for a current time period, the current collaboration graph may be compared to the average collaboration graph to determine whether the current collaboration patterns of the target user are anomalous. Anomalous collaboration patterns may indicate that the target user is posing an insider threat. For example, where a target user suddenly begins sharing electronic files with another user with whom the target user does not typically share electronic files, this anomalous collaboration pattern may indicate that the target user has gone rogue and poses an insider threat. In another example, where a target user suddenly begins accessing a large number of network devices that the target user does not typically access, this anomalous collaboration pattern may indicate that the target user has gone rogue and poses an insider threat. Where an anomalous collaboration pattern by a target user of a target network device is automatically detected, a security module and/or network administrator may then perform a security action on the target network device in time to defend the network, thus leaving the network less vulnerable.

Figure 1:
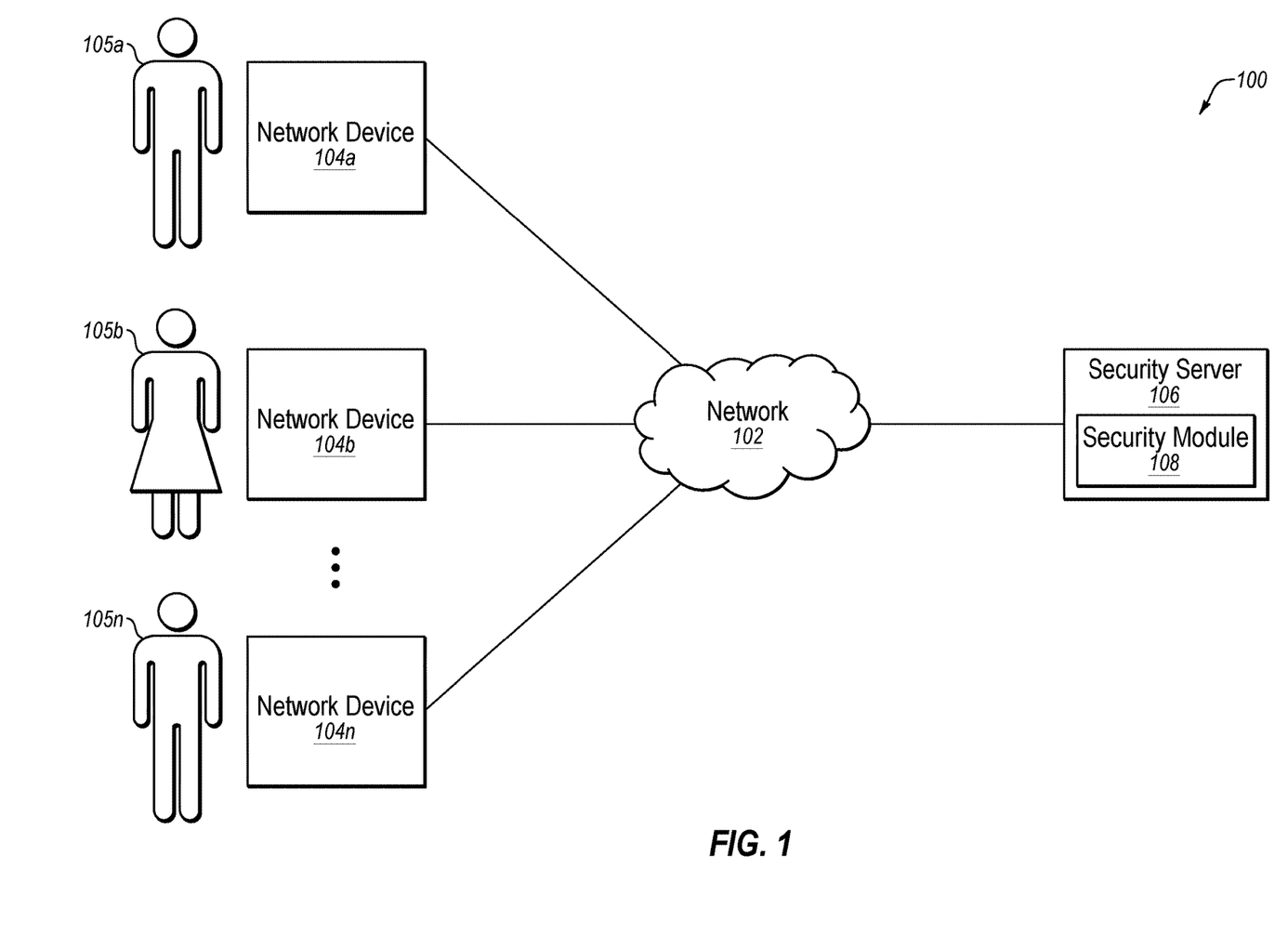
FIG. 1 illustrates an example system configured for automatically detecting insider threats using user collaboration patterns.

Turning to the figures, FIG. 1 illustrates an example system 100 configured for automatically detecting insider threats using user collaboration patterns. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
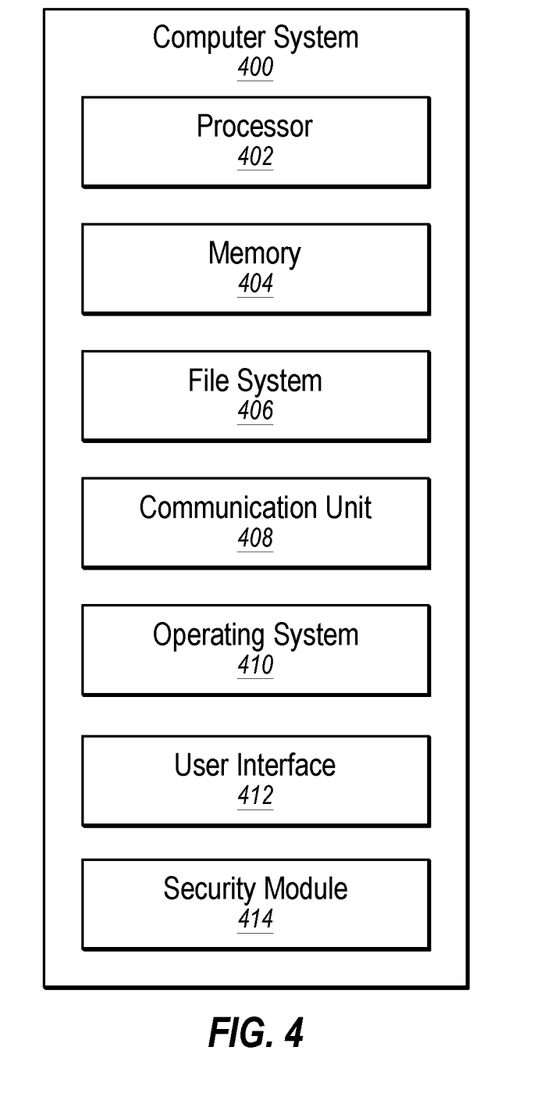
FIG. 4 illustrates an example computer system that may be employed in automatically detecting insider threats using user collaboration patterns.

In some embodiments, each of the network devices 104a-104n may be any computer system capable of communicating over the network 102, examples of which are disclosed herein in connection with the computer system 400 of FIG. 4. In some embodiments, each of the network devices 104a-104n may each be associated with users 105a-105n, respectively. In some embodiments, at least one of the users 105a-105n may be an insider, such that the user has access to network resources within the network 102. Network resources may include electronic and/or computer resources accessible through the network 102 including one or more of an electronic file, online documentation, a network device, and a database.

In some embodiments, the security server 106 may be any computer system capable of communicating over the network 102 and capable of monitoring the network devices 104a-104n, examples of which are disclosed herein in connection with the computer system 400 of FIG. 4. In some embodiments, the security server 106 may be part of an SOC for an organization that manages the network 102 and the network devices 104a-104n. In some embodiments, the server may include a security module 108 that may be configured for automatically detecting insider threats using user collaboration patterns in order to secure the network 102 and/or any of the network devices 104a-104n in the network 102, as disclosed in greater detail in connection with FIGS. 2 and 3 herein. In some embodiments, the security module 108 may include, or be part of, a User Behavior Analytics (UBA) application and/or a Security Information and Event Management (SIEM) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
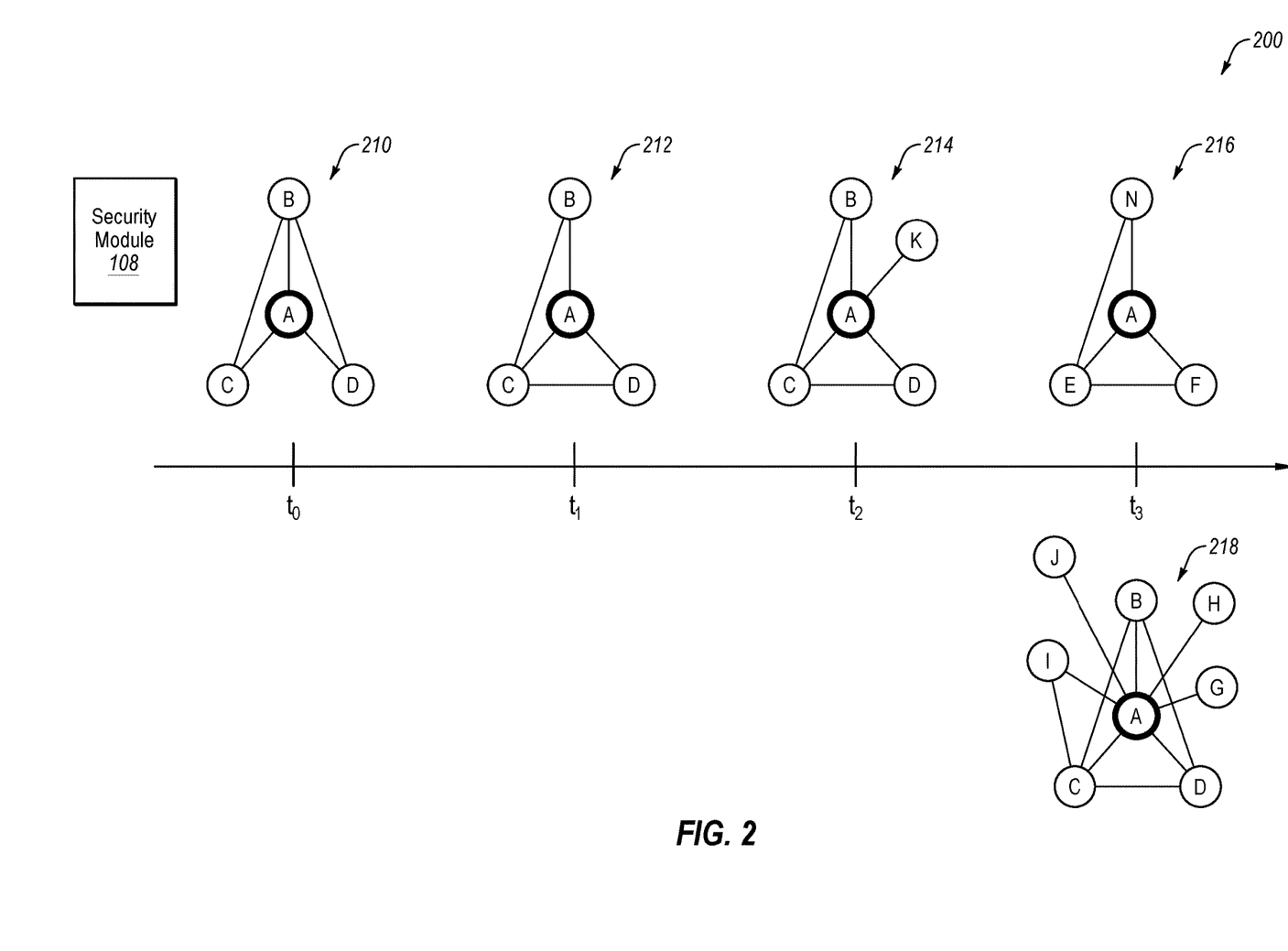
FIG. 2 is a flowchart of example collaboration graphs that may be employed in automatically detecting insider threats.

FIG. 2 is a flowchart 200 of example collaboration graphs 210-218 that may be employed in automatically detecting insider threats. As disclosed in FIG. 2, the collaboration graphs 210-218 may represent collaborative access of one or more network resources in a network between a target user using a target network device and other users using other network devices. The collaboration graphs 210-218 may include nodes A-K and N representing users and edges representing collaborative access of the one or more network resources during time periods $t_0$-$t_3$.

In some embodiments the time periods $t_0$-$t_3$ may each represent one hour, two hours, one day, one week, or one month, for example. Also, in some embodiments, the node A in the collaboration graphs 210-218 may represent a target user using a target network device, such as the user 105a using the network device 104a of FIG. 1. Further, in some embodiments, the other nodes B-K and N in the collaboration graphs 210-218 may represent other users using other network devices, such as the users 105b-105n using the network devices 104b-104n in FIG. 1.

In some embodiments, the time periods $t_0$-$t_2$ may represent multiple prior time periods and the time period $t_3$ may represent a current time period. In these embodiments, the security module 108 may combine the collaboration graphs 210, 212, and 214 to generate an average collaboration graph. Also, in these embodiments, the average collaboration graph may represent the prior average collaborate access of the target user (represented by node A) during the prior time periods $t_0$-$t_2$, and the collaboration graphs 216 and 218 may each alternatively represent the current collaborate access of the target user (represented by node A) during the current period $t_3$. In general, an average collaboration graph may include an average number of nodes and an average number of edges seen in the prior collaboration graphs. The nodes and edges of the average collaboration graph may be probabilistically chosen based on their frequency and recency of occurrences. The probability may be higher for higher frequency and more recently seen nodes and edges. The security module 108 may then compare the average collaboration graph and the current collaboration graph 216 or 218 to determine whether the collaborative access of the one or more network resources by the target user (represented by node A) during the current time period $t_3$ is anomalous. Then, if the collaborative access by the target user is anomalous, the security module 108 may perform a security action on the target network device.

For example, the security module 108 may compare the average collaboration graph and the current collaboration graph 216 and determine that the current collaboration graph 216 has a different composition than the average collaboration graph. In particular, the current collaboration graph 216 includes nodes E, F, and N, while none of these nodes may appear in the average collaboration graph (because they didn't appear in any of the prior collaboration graphs 210, 212, and 214 from which the average collaboration graph was generated). This difference in composition in the current collaboration graph 216 may indicate that the target user (represented by node A) suddenly began collaborating with different users during the current time period $t_3$, which may indicate that the target user has become an insider threat.

In another example, the security module 108 may compare the average collaboration graph and the current collaboration graph 218 and determine that the current collaboration graph 218 is larger in size than the average collaboration graph. In particular, the current collaboration graph 218 includes eight nodes (i.e., nodes A, B, C, D, G, H, I, and J) while the average collaboration graph may only include four or five nodes (because the prior collaboration graphs 210, 212, and 214, from which the average collaboration graph was generated, each only include 4 or 5 nodes). This increase in size of the current collaboration graph 218 may indicate that the target user (represented by node A) suddenly began collaborating with additional users during the current time period $t_3$, which may indicate that the target user has become an insider threat. It is noted that a decrease in size of a current collaboration graph may similarly indicate that a target user suddenly began collaborating with fewer users during a current time period, which may indicate that the target user has become an insider threat.

In some embodiments, the combining by the security module 108 of the collaboration graphs 210, 212, and 214 to generate an average collaboration graph may be performed in a variety of ways. For example, the security module 108 may receive as input a target user (represented by node A) and a list of the collaboration graphs 210, 212, and 214. Each of the collaboration graphs may be a weighted graph G=(E, V), where V is the set of nodes (also known as vertices) A-K and N corresponding to the users in a neighborhood network and E is the set of weighted edges in the collaboration graphs 210, 212, and 214. Each edge may capture the degree of collaboration between two users as a Jaccard Index value w, where 0<w<=1. The Jaccard Index may be computed over the set of network resources accessed by each of the two users.

In one embodiment, the security module 108 may generate the following collaboration graphs $g_0$-$g_4$ for time periods $t_0$-$t_4$, with nodes u-u7, and with each edge between nodes p and q with weight w represented as (p, q, w):

$t_0$: $g_0$=({u, u1, u2, u3, u4}, {(u, u1, 0.3), (u, u2, 0.2), (u, u3, 0.7), (u, u4, 0.3)})

$t_1$: $g_1$=({u, u1, u2, u3, u4}, {(u, u1, 0.1), (u, u2, 0.3), (u, u3, 0.2), (u, u4, 0.1), (u3, u4, 0.3)})

$t_2$: $g_2$=({u, u1, u2, u3}, {(u, u1, 0.2), (u, u2, 0.3), (u, u3, 0.1), (u1, u2, 0.1)})

$t_3$: $g_3$=({u, u1, u2, u3, u4}, {(u, u1, 0.1), (u, u2, 0.1), (u, u3, 0.2), (u, u4, 0.1), (u1, u2, 0.2)})

$t_4$: $g_4$=({u, u1, u2, u3, u5}, {(u, u1, 0.1), (u, u2, 0.1), (u, u3, 0.2), (u, u5, 0.1), (u1, u2, 0.3)})

$t_5$: $g_5$=({u, u2, u5, u6, u7}, {(u, u2, 0.1), (u, u5, 0.1), (u, u6, 0.2), (u, u7, 0.9), (u2, u6, 0.1), (u2, u7, 0.3), (u6, u7, 1.0)})

In this embodiment, the average number of nodes (#avg_nodes) and edges (#avg_edges) seen for the time periods $t_0$-$t_4$ may be:

$t_0$: #avg_nodes=0, #avg_edges=0—note, there is no average graph $t_1$: #avg_nodes=5, #avg_edges=4

$t_2$: #avg_nodes=5, #avg_edges=5

$t_3$: #avg_nodes=5, #avg_edges=4

$t_4$: #avg_nodes=5, #avg_edges=5

$t_5$: #avg_nodes=5, #avg_edges=5

In this embodiment, the generating of each average collaboration graph by the security module 108 may include a probabilistic step, resulting in slight changes to each average collaboration graph that is generated based on probabilities. In this embodiment, the security module 108 may generate the following average collaboration graphs:

$t_0$: no average graph $t_1$: $ag_4$=({u, u1, u2, u3, u4}, {(u, u1, 0.3), (u, u2, 0.2), (u, u3, 0.7), (u, u4, 0.3)})

$t_2$: $ag_2$=({u, u1, u2, u3, u4}, {(u, u1, 0.2), (u, u2, 0.25), (u, u3, 0.45), (u, u4, 0.2), (u3, u4, 0.3)})

$t_3$: $ag_3$=({u, u1, u2, u3, u4}, {(u, u1, 0.2), (u, u2, 0.27), (u, u3, 0.33), (u, u4, 0.2)})

$t_4$: $ag_4$=({u, u1, u2, u3, u4}, {(u, u1, 0.18), (u, u2, 0.23), (u, u3, 0.3), (u, u4, 0.17), (u1, u2, 0.15)})

$t_5$: $ag_5$=({u, u1, u2, u3, u4}, {(u, u1, 0.16), (u, u2, 0.2), (u, u3, 0.28), (u, u4, 0.17), (u1, u2, 0.2)})

In this embodiment, for each incoming graph at time $t_i$, the security module 108 may obtain an anomaly score by computing the distance of the current collaboration graph $g_i$ from the average collaboration graph $ag_i$. The security module 108 may generate an anomaly score between the current collaboration graph (N, E) and the average collaboration graph ($N_{avg}$, $E_{avg}$) as follows:

$$\text{Anomaly Score} = W_{node} * \text{NodeDistance}(N, N_{avg}) + W_{edge} * \text{EdgeDistance}(E, E_{avg}),$$

where:

NodeDistance(N, $N_{avg}$)=1−JaccardIndex(N, $N_{avg}$),

EdgeDistance(E, $E_{avg}$)=1−Sum of weights of common edges between E and $E_{avg}$/(Sum of weights of common edges+weights of exclusive edges), and $W_{node}$, $W_{edge}$ are in [0, 1] and $W_{node}$+$W_{edge}$=1

In this embodiment, assuming parameter values $W_{node}$=$W_{edge}$=0.5, the security module 108 may generate the following anomaly scores:

$t_0$: anomaly score=0—note, no average graph exists at the start $t_1$: anomaly score=0.06

$t_2$: anomaly score=0.64

$t_3$: anomaly score=0.05
$t_4$: anomaly score=0.57
$t_5$: anomaly score=0.96

In this embodiment, at time $t_1$, the average collaboration graph $ag_1=g_0$ because there is only one prior collaboration graph. At time $t_2$, the security module 108 may generate the average graph $ag_2$ by using $g_0$ and $g_1$. In general, $ag_n$=AverageNetwork(u, $[g_0, g_1, \ldots, g_{n-1}]$). Also, in this embodiment, assuming that anomaly scores from $t_0$ to $t_2$ are used for a learning phase, the security module 108 may generate the following mean and standard deviation scores:

$t_3$: anomaly score=0.05, mean$_{t0-t2}$=0.23, std$_{t0-t2}$=0.29
$t_4$: anomaly score=0.57, mean$_{t0-t3}$=0.19, std$_{t0-t3}$=0.26
$t_5$: anomaly score=0.96, mean$_{t0-t4}$=0.27, std$_{t0-t4}$=0.28

In this embodiment, the security module 108 may determine that the collaborative access of the one or more network resources during the current time period $t_5$ is anomalous by determining that the anomaly score exceeds a threshold of 2.00 times away from the mean in terms of standard deviation because the anomaly score is 2.47 times away from the mean in terms of standard deviation. In contrast, the security module 108 may determine that the collaborative access of the one or more network resources during the current time periods $t_3$ and $t_4$ are not anomalous by determining that the anomaly scores do not exceed the threshold of 2.00 times away from the mean in terms of standard deviation because the anomaly scores are less than 2.00 times away from the mean in terms of standard deviation.

Modifications, additions, or omissions may be made to the collaboration graphs in the flowchart 200 without departing from the scope of the present disclosure. For example, in some embodiments, the three prior collaboration graphs may include as few as two prior collaboration graphs or four or more prior collaboration graphs. Further, each of the collaboration graphs may include many more nodes and edges than illustrated in FIG. 2.

Figure 3:
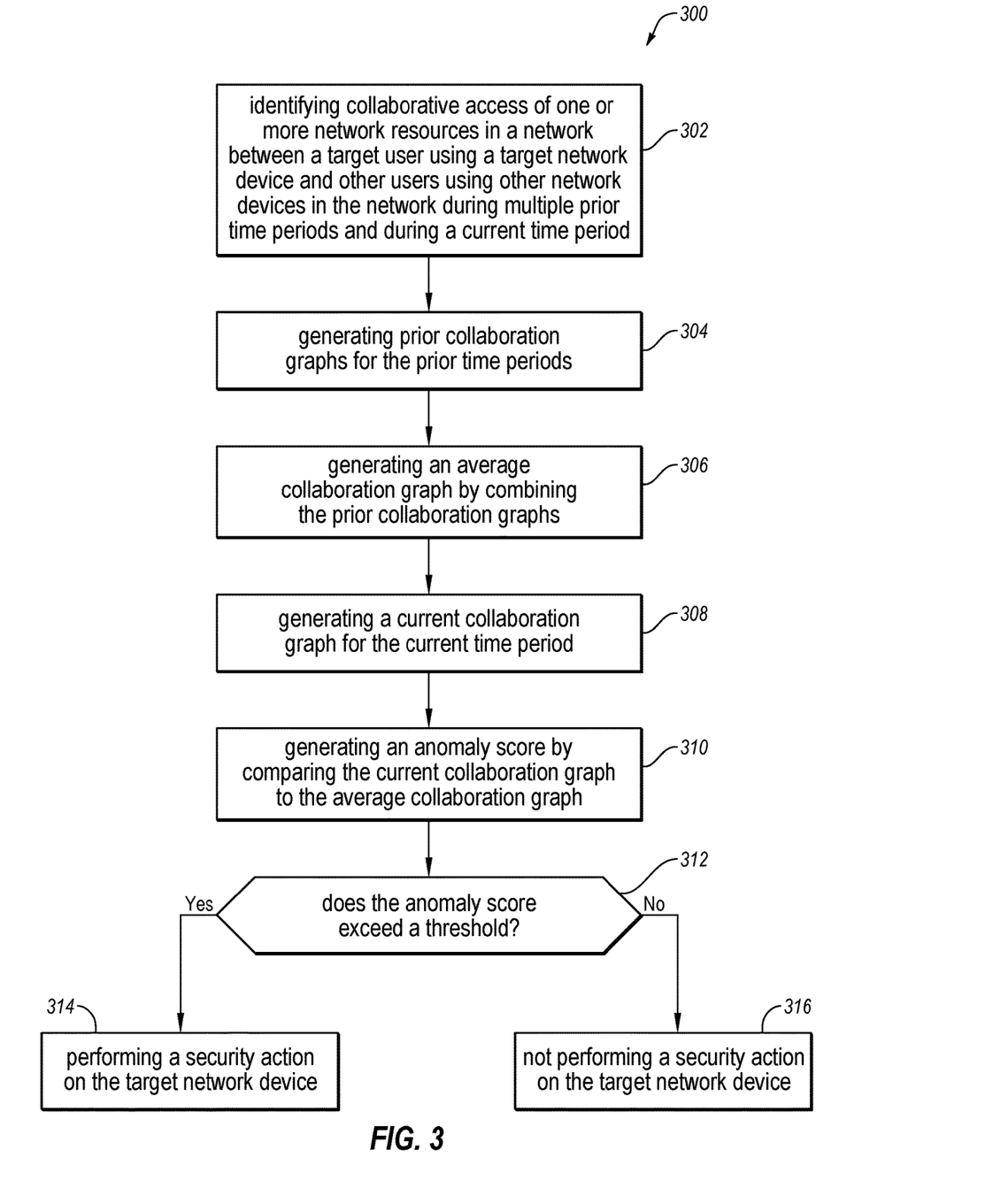
FIG. 3 is a flowchart of an example method for automatically detecting insider threats using user collaboration patterns.

FIG. 3 is a flowchart of an example method 300 for automatically detecting insider threats using user collaboration patterns. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at block 302, identifying collaborative access of one or more network resources in a network between a target user using a target network device and other users using other network devices in the network during multiple prior time periods and during a current time period. For example, the security module 108 may identify, at block 302, collaborative access of one or more network resources (such as one or more of an electronic file, online documentation, a network device, and a database) in the network 102 between a target user 105a using a target network device 104a and other users 105b-105n using other network devices 104b-104n in the network 102 during multiple prior time periods $t_0$-$t_2$ and during a current time period $t_3$.

The method 300 may include, at block 304, generating prior collaboration graphs for the prior time periods. In some embodiments, nodes of the prior collaboration graphs may represent the target user and the other users, and edges of the prior collaboration graphs may represent collaborative access of the one or more network resources, during the prior time periods between the target user and the other users. For example, the security module 108 may generate, at block 304, the prior collaboration graphs 210, 212 and 214 for the prior time periods $t_0$, $t_1$, and $t_2$, respectively. The nodes A-D and K of the prior collaboration graphs 210, 212 and 214 may represent the target user 105a and the other users 105b-105n, and the edges of the prior collaboration graphs 210, 212 and 214 may represent collaborative access of the one or more network resources (such as one or more of an electronic file, online documentation, a network device, and a database), during the prior time periods $t_0$, $t_1$, and $t_2$ between the target user 105a and the other users 105b-105n.

The method 300 may include, at block 306, generating an average collaboration graph by combining the prior collaboration graphs. In some embodiments, the generating of the average collaboration graph may include generating a k-step neighborhood network of the prior collaboration graphs. For example, the security module 108 may generate, at block 306, an average collaboration graph by combining the prior collaboration graphs 210, 212 and 214. The average collaboration graph may be generated as a k-step neighborhood network of the prior collaboration graphs 210, 212 and 214, as discussed elsewhere herein.

The method 300 may include, at block 308, generating a current collaboration graph for the current time period. In some embodiments, nodes of the current collaboration graph may represent the target user and the other users and edges of the current collaboration graph may represent collaborative access of the one or more network resources during the current time period between the target user and the other users. For example, the security module 108 may generate, at block 308, the current collaboration graph 216, or alternatively the current collaboration graph 218, for the current time period $t_3$. The nodes of the current collaboration graph 216 or 218 may represent the target user 105a and the other users 105b-105n, and the edges of the current collaboration graph 216 or 218 may represent collaborative access of the one or more network resources (such as one or more of an electronic file, online documentation, a network device, and a database), during the current time period $t_3$ between the target user 105a and the other users 105b-105n.

The method 300 may include, at block 310, generating an anomaly score by comparing the current collaboration graph to the average collaboration graph. In some embodiments, the generating of the anomaly score may include determining a distance between the current collaboration graph and the average collaboration graph. For example, the security module 108 may generate, at block 310, an anomaly score by comparing the current collaboration graph 216 to the average collaboration graph generated at block 308. The generating of the anomaly score may include determining a distance between the current collaboration graph 216 and the average collaboration graph, as discussed elsewhere herein.

The method 300 may include, at decision block 312, determining whether the anomaly score exceeds a threshold. If so (yes at decision block 312), this may indicate that the collaborative access of the one or more network resources is anomalous during the current time period and the method 300 may include, at block 314, performing a security action on the target network device. If not (no at decision block 312), this may indicate that the collaborative access of the one or more network resources is not anomalous during the current time period and the method 300 may include, at block 316, not performing any security action on the target network device. In some embodiments, the determining, at block 312, of whether the anomaly score exceeds the threshold may include determining whether the current collaboration graph is larger or smaller in size than the average collaboration graph. In some embodiments, the determining, at block 312, of whether the anomaly score exceeds the threshold may include determining whether the current collaboration graph has a different composition than the average collaboration graph. In some embodiments, the performing, at block 314, of the security action on the target network device may include one or more of blocking the target network device from having access to a website, at least partially blocking the target network device from having access to the network, at least partially blocking the target network device from sending data over the network, and preventing the target network device from accessing email.

For example, the security module 108 may determine, at decision block 312, that the anomaly score generated at block 310 exceeds a threshold, indicating that the collaborative access of the one or more network resources by the target user 105a using the target network device 104a is anomalous during the current time period $t_3$. In this example, the determination, at decision block 312, that the anomaly score exceeds the threshold may include determining that the current collaboration graph 218 is larger or smaller in size than the average collaboration graph. Alternatively, in this example, the determining that the anomaly score exceeds the threshold may include determining that the current collaboration graph 216 has a different composition than the average collaboration graph. In this example, the security module 108 may then perform, at block 314, a security action on the target network device 104a, such as blocking the target network device 104a from having access to a website, at least partially blocking the target network device 104a from having access to the network 102, at least partially blocking the target network device 104a from sending data over the network 102, or preventing the target network device 104a from accessing email.

Alternatively, the security module 108 may determine, at decision block 312, that the anomaly score generated at block 310 does not exceed a threshold, indicating that the collaborative access of the one or more network resources by the target user 105a using the target network device 104a is not anomalous during the current time period $t_3$. The security module 108 may then not perform, at block 314, any security action on the target network device 104a.

In some embodiments, the method 300 may enable automatic detection of an anomalous collaboration pattern by a target user of a target network device. This may allow the limited time, energy, and resources of a security module or of a limited number of network administrators to be utilized in a more effective manner than conventional anomaly detection that is performed manually. Automatic detection of an anomalous collaboration pattern by a target user of a target network device may indicate that the target user poses an insider threat and may enable a security module and/or a network administrator to perform a security action on the network or on the target network device in time to defend the network from any insider threat, thus leaving the network less vulnerable.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, blocks 302-312 may be performed without performing block 314 or block 316. Also, in some embodiments, block 314 may be eliminated or may be performed by a network administrator or other entity that is different from the entity performing the other blocks of the method 300. Further, in some embodiments, blocks 302-310 may be performed in parallel with the performance of one or more of blocks 312-316.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by automatically detecting insider threats using user collaboration patterns, thus enabling a security module and/or a network administrator to perform a security action on the network or on the target network device in time to defend the network from any insider threat, thus leaving the network less vulnerable. The method 300 may thus result in the automatic detection of an insider threat to a network in a more effective manner than conventional insider threat detection processes that are performed manually.

Also, the method 300 may improve the technical field of detecting and mitigating against insider threats. Employing user collaboration patterns to automatically detect insider threats is an improvement over conventional attempts at detecting insider threats using manual processes.

FIG. 4 illustrates an example computer system 400 that may be employed in automatically detecting insider threats using user collaboration patterns. In some embodiments, the computer system 400 may be part of any of the systems or devices described in this disclosure. For example, the computer system 400 may be part of any of the network devices or the security server of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIG. 3. In some embodiments, the security module 414 may be part of the operating system 410 or may be part of an application of the computer system 400, or may be some combination thereof. In some embodiments, the security module 414 may function as the security module 108 of FIGS. 1 and 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for automatically detecting insider threats using user collaboration patterns, at least a portion of the method being performed by a computing device comprising at least one processor, the method comprising:

identifying collaborative access of one or more network resources in a network between a target user using a target network device and other users using other network devices in the network during multiple prior time periods and during a current time period;

generating prior collaboration graphs for the prior time periods with nodes representing the target user and the other users and edges representing collaborative access of the one or more network resources during the prior time periods between the target user and the other users;

generating an average collaboration graph by combining the prior collaboration graphs, the average collaboration graph including an average number of nodes and an average number of edges from the prior collaboration graphs, with nodes and edges of the average collaboration graph being probabilistically chosen based on their frequency and recency of occurrence;

generating a current collaboration graph for the current time period with nodes representing the target user and the other users and edges representing collaborative access of the one or more network resources during the current time period between the target user and the other users;

generating an anomaly score by comparing the current collaboration graph to the average collaboration graph;

determining that the collaborative access of the one or more network resources during the current time period is anomalous by determining that the anomaly score exceeds a threshold based on the current collaboration graph being larger or smaller in size than, or having a different composition than, the average collaboration graph; and in response to the anomaly score exceeding the threshold, performing a security action on the target network device.

2. The method of claim 1, wherein the one or more network resources comprise one or more of an electronic file, online documentation, a network device, and a database.

3. The method of claim 1, wherein the generating of the average collaboration graph comprises generating a k-step neighborhood network of the prior collaboration graphs.

4. The method of claim 1, wherein the generating of the anomaly score comprises determining a distance between the current collaboration graph and the average collaboration graph.

5. The method of claim 1, wherein the performing of the security action on the target network device comprises one or more of blocking the target network device from having access to a website, at least partially blocking the target network device from having access to the network, at least partially blocking the target network device from sending data over the network, and preventing the target network device from accessing email.

6. The method of claim 1, wherein the determining that the anomaly score exceeds the threshold is based on the current collaboration graph being larger or smaller in size than the average collaboration graph.

7. The method of claim 1, wherein the determining that the anomaly score exceeds the threshold is based on the current collaboration graph having a different composition than the average collaboration graph.

8. The method of claim 1, wherein the method is performed in one or more of a User Behavior Analytics (UBA) application and a Security Information and Event Management (SIEM) application.

9. One or more non-transitory computer-readable media comprising one or more computer-readable instructions that, when executed by one or more processors of one or more computing devices, cause the one or more computing devices to perform a method for automatically detecting insider threats using user collaboration patterns, the method comprising:

identifying collaborative access of one or more network resources in a network between a target user using a target network device and other users using other network devices in the network during multiple prior time periods and during a current time period;

generating prior collaboration graphs for the prior time periods with nodes representing the target user and the other users and edges representing collaborative access of the one or more network resources during the prior time periods between the target user and the other users;

generating an average collaboration graph by combining the prior collaboration graphs, the average collaboration graph including an average number of nodes and an average number of edges from the prior collaboration graphs, with nodes and edges of the average collaboration graph being probabilistically chosen based on their frequency and recency of occurrence;

generating a current collaboration graph for the current time period with nodes representing the target user and the other users and edges representing collaborative access of the one or more network resources during the current time period between the target user and the other users;

generating an anomaly score by comparing the current collaboration graph to the average collaboration graph;

determining that the collaborative access of the one or more network resources during the current time period is anomalous by determining that the anomaly score exceeds a threshold based on the current collaboration graph being larger or smaller in size than, or having a different composition than, the average collaboration graph; and in response to the anomaly score exceeding the threshold, performing a security action on the target network device.

10. The one or more non-transitory computer-readable media of claim 9, wherein the one or more network resources comprise one or more of an electronic file, online documentation, a network device, and a database.

11. The one or more non-transitory computer-readable media of claim 9, wherein the generating of the average collaboration graph comprises generating a k-step neighborhood network of the prior collaboration graphs.

12. The one or more non-transitory computer-readable media of claim 9 wherein the generating of the anomaly score comprises determining a distance between the current collaboration graph and the average collaboration graph.

13. The one or more non-transitory computer-readable media of claim 9, wherein the performing of the security action on the target network device comprises one or more of blocking the target network device from having access to a website, at least partially blocking the target network device from having access to the network, at least partially blocking the target network device from sending data over the network, and preventing the target network device from accessing email.

14. The one or more non-transitory computer-readable media of claim 9, wherein the determining that the anomaly score exceeds the threshold is based on the current collaboration graph being larger or smaller in size than the average collaboration graph.

15. The one or more non-transitory computer-readable media of claim 9, wherein the determining that the anomaly score exceeds the threshold is based on the current collaboration graph having a different composition than the average collaboration graph.

16. The one or more non-transitory computer-readable media of claim 9, wherein the method is performed in one or more of a User Behavior Analytics (UBA) application and a Security Information and Event Management (SIEM) application.

* * * * *